Sept. 7, 1937.   J. C. CONRAD   2,092,303
APPARATUS FOR MEASURING VISIBLY THE DEGREE OF TENSION ON WIRE LINES
Filed Nov. 19, 1935   3 Sheets-Sheet 1
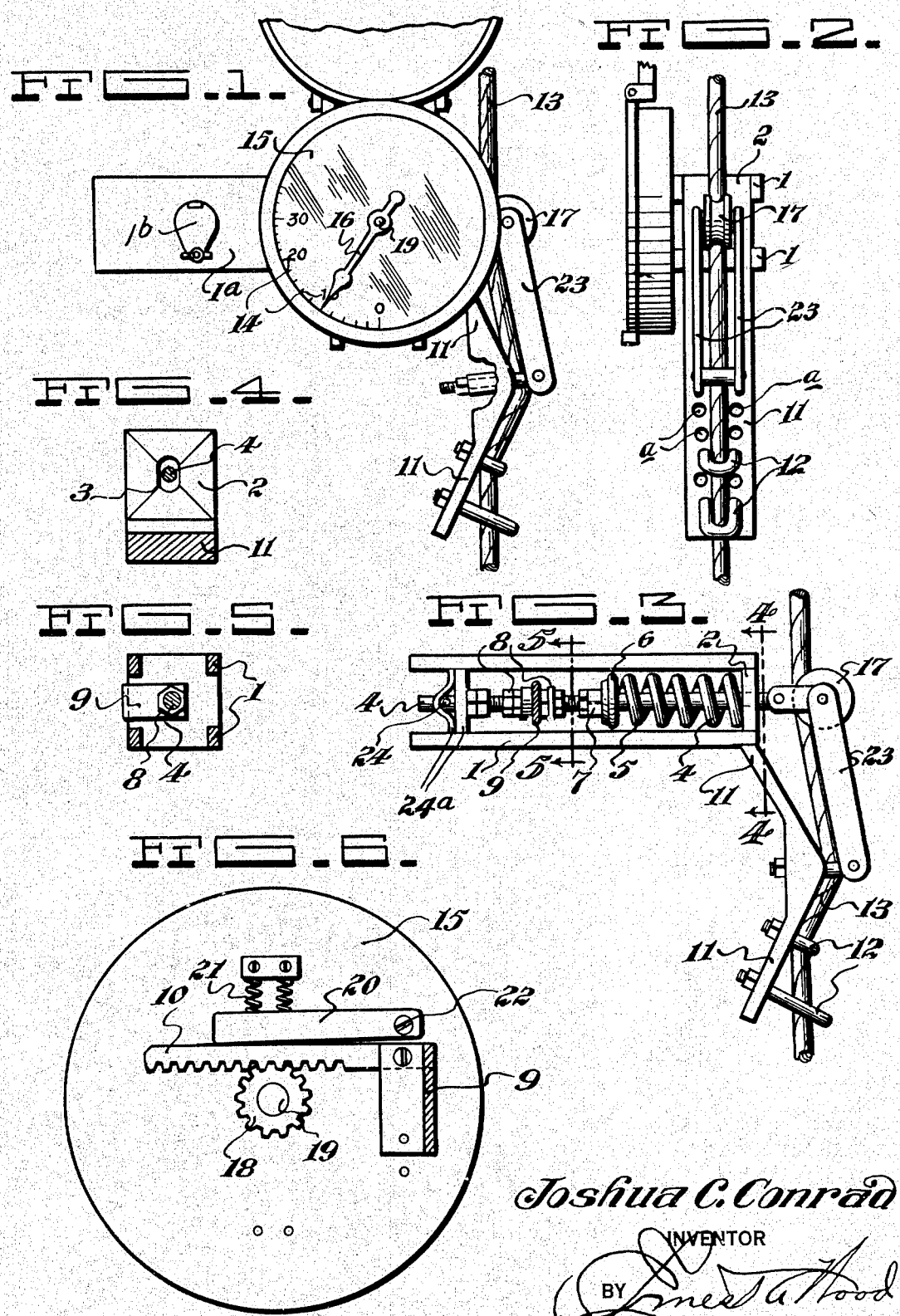
Joshua C. Conrad
INVENTOR
BY Ernest A. Hood
ATTORNEY Sept. 7, 1937. J. C. CONRAD 2,092,303
APPARATUS FOR MEASURING VISIBLY THE DEGREE OF TENSION ON WIRE LINES
Filed Nov. 19, 1935 3 Sheets-Sheet 2
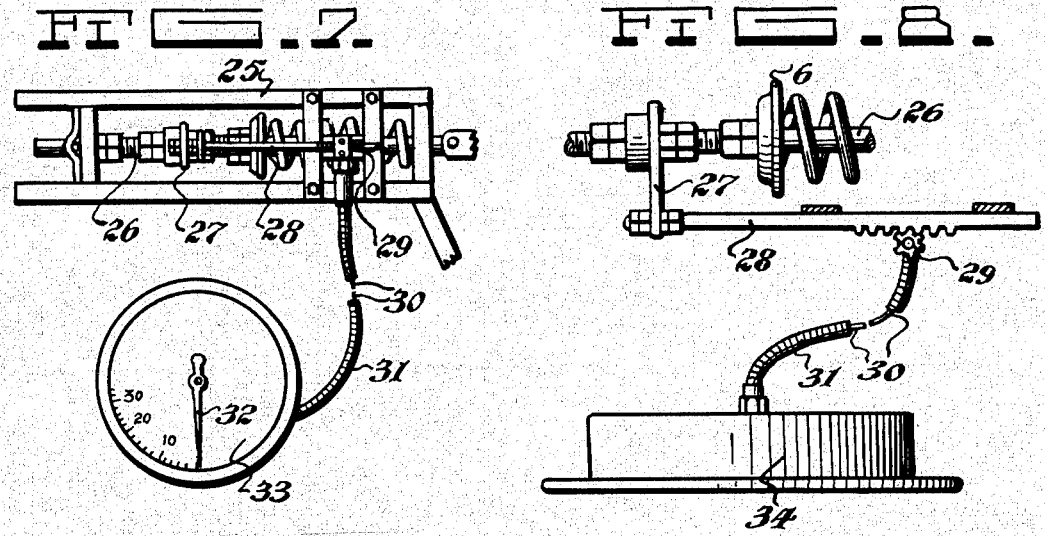
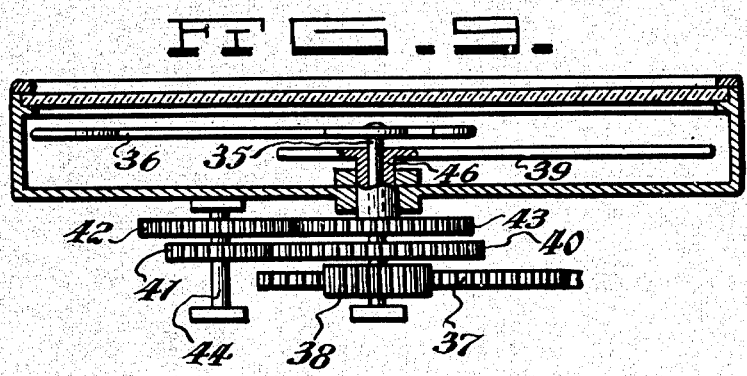
Joshua C. Conrad
INVENTOR.
ATTORNEYS.

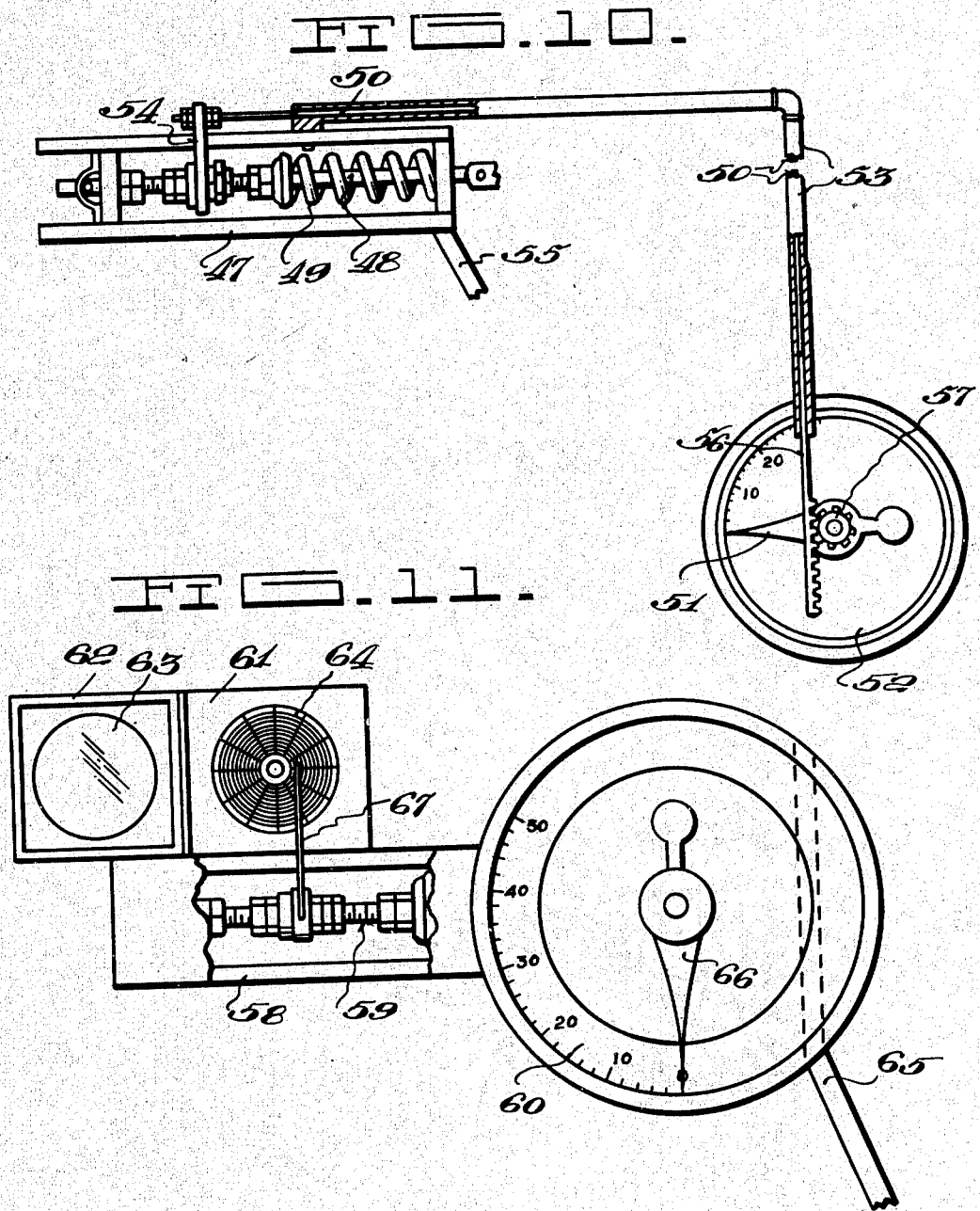

Patented Sept. 7, 1937

2,092,303

UNITED STATES PATENT OFFICE 2,092,303

APPARATUS FOR MEASURING VISIBLY THE DEGREE OF TENSION ON WIRE LINES

Joshua C. Conrad, Oklahoma City, Okla.

Application November 19, 1935, Serial No. 50,521

5 Claims. (Cl. 265—1.6)

This invention relates to apparatus for measuring visibly the degree of tension on wire lines, cable and the like and it has particular reference to a device or instrument for determining instantly the load carried by one or more cables used especially in well drilling.

The principal object of the invention is to provide a calibrated dial having attendant mechanism designed for connection to a cable, wire line or the like, bearing the full weight of a load which will reflect on said dial the exact weight of the load.

Another object of the invention is to provide in said attendant mechanism a peculiarly shaped arm, the angular shape of which is instrumental in confining to a certain point in the length of the cable, the weight of the load to which the cable is subjected and at this point, a measurement is made by the invention as to the actual weight of the load or the tension on the cable.

Another object of the invention is to provide, as a part of the said attendant mechanism, a means to effect true registration of the pointer passing over the calibrated dial by removing all possible friction likely to interfere with accurate indication.

Still another object of the invention is to provide in an apparatus of the character specified, means by which the actual and visible indicating means may be disposed at a point remote from the cable from which the actual tensional test is obtained.

Yet another object of the invention is to provide an auxiliary pointer, in addition to the point on the said calibrated dial for operation when said dial is situated at a point remote from the operator and by which certain limited and minor variations in cable tension may be instantly and remotely noted, such as caused by a slight elevation of the drilling tools in a well.

A still further object of the invention is to provide means for securing a permanent record of the line tension continuously during drilling or other operations.

With the foregoing objects as paramount, the invention has particular reference to its salient features of construction and arrangement of parts, which will become manifest as the description proceeds, taken in connection with the accompanying drawings, wherein:—

Figure 1 is a front elevation of the invention.
Figure 2 is a side elevation.
Figure 3 is a side elevation.
Figure 4 is a section on lines 4—4 on Figure 3.
Figure 5 is a view on lines 5—5 on Figure 3.
Figure 6 is a rear view of the dial.
Figure 7 is a modified form of the invention showing a flexible connection between the indicator and operating mechanism.
Figure 8 is a fragmentary plan view of Figure 7.
Figure 9 is a plan view of the dial in transverse section showing the same as having a main and an auxiliary pointer.
Figure 10 is a further modified form of the invention, showing the indicator proper as being operated from a remote point, and
Figure 11 is a plan view showing a recording chart and stylus for making a permanent record of the tension shown on the indicating dial.

Continuing with a more detailed description of the drawings, 1 designates a frame having an end plate 2, the latter being provided with a slot 3 through which protrudes a rod 4. The rod 4 is capable of longitudinal movement and surrounding the same is a spring 5 resisting such movement. The frame 1 has a shell or housing 1ª, provided with an opening for easy access to the working parts of the assembly enclosed in the housing, the said opening being provided with a pivoted closure 1ᵇ.

It will be noted in Figure 3 that the spring 5 is disposed between the plate 2 and the washer 6, the latter reposing against lock nuts 7 which are threaded on the rod 4 and are therefore adjustable to effect adjustment of the tension on the spring 5. Other lock nuts 8 embrace a plate 9, likewise arranged on the rod 4 and which provides a connection between the rod and a gear rack 10. See Figure 6. Reference to this connection will again be made presently.

Fixedly connected to the frame 1 is an angular arm 11. One portion of the arm extends outwardly from the frame and the other portion inwardly and the latter portion is provided with means, clevises 12, by which it is secured to a cable 13, the tension on which it is desired to test or determine.

In Figure 2 it will be observed, that the lower portion of the angular arm is provided with a series of apertures a in which the clevises 12 may be adjustably arranged. This adjustment is for the purpose of varying the degree of tension on the cable 13 in accordance with the calibrations 14 on a dial 15, over which moves the pointer 16.

The rod 4 has a roller 17 on its outer end which is grooved to embrace the cable as shown, thereby imposing on the spring 5 the weight borne by the cable 13 and which is visibly computed on the dial 15 through the connection afforded, in the present case, by the rack 10 and cooperating pinion 18, the latter being fixedly connected to the pointer shaft 19. In other words, when the rod 4 moves longitudinally by reason of increased or decreased tension on the cable, the plate 9 imparts longitudinal movement to the rack 10, which latter actuates the pointer 16. The spacing at the apertures $a$ in the angular arm 11 being accurately and predeterminately calculated in accordance with the calibrations on the dial, a skilled operator will know instantly in what apertures the clevises are required to be inserted to retain the cable for proper tension measurement. The apertures, in the present case are spaced substantially to cover the following range: For four lines, or approximately 50,000 pounds, the cable is connected at the apertures next adjacent the top; for six lines, approximately 33,000 pounds, to the fourth or fifth set of apertures; for eight lines, 25,000 pounds, and so on, to lower sets of apertures.

Thus, the outward urge on the frame is either increased or decreased, bringing about the required tension on the spring 5 to transmit motion to the indicator pointer which accurately and visibly denotes the weight carried by the line assembly.

As a precaution against displacement, the invention provides a retainer for the rack 10 to hold the same in operative relationship with the pinion 18, as shown in Figure 6. This retainer is in the form of an arm 20, urged by springs 21 against the rack. The arm 20 is pivoted at 22 to the underside of the dial 15. It will be understood that by lifting the arm 20, the rack may be disengaged from the pinion to effect resetting of the pointer 16 on the dial if and when this is required.

It will be noted that since it is desired to maintain the rod 4 at all times in centered relationship to the frame 1, and since the tendency on the part of the cable 13 is to urge the rod to an uncentered position, links 23 are provided and disposed to carry the roller 17 therebetween and are adapted to hold the rod 4 in a central position in the slot 3 of the end plate 2 of the frame. Moreover, it is pointed out that a lubricating chamber 24 is provided adjacent the end of the frame 1 farthest from the cable 13. This lubricating chamber is comprised of the cross-members 24ª, stationary with the frame 1 and apertured to receive the rod 4 and through which the latter freely moves, the lubricant in the chamber being thus distributed on the rod to minimize frictional wear thereon.

In Figures 7 to 9 inclusive is shown a modified example of the invention inasmuch as the structure shown provides first, means by which the indicating dial may be located at a point distant from the operating mechanism, which must be connected to the cable whose tension is to be measured and second, a dial having two pointers, one indicating the weight at close range and an auxiliary pointer whose movement is substantially twice that of the first pointer for observation at points distant.

These modifications comprise a frame 25 not unlike the structure first defined, which has a rod 26 extending axially therethrough and spring actuated. To the rod is connected a plate 27 and to the plate in turn is connected a gear rack 28, parallel with the rod 26. A pinion 29 engages the rack and transmits its motion to a flexible drive cable 30 in a sheath 31. The drive cable 30 is connected directly to the shaft carrying the pointer 32 which moves over the calibrated dial 33. By this arrangement, the dial housing 34 may be situated at a point remote from the frame 25 for convenience.

In cases however where it is undesirable to employ the flexible drive just described, a dial is provided with two pointers, one for close observation and another whose degree of movement is substantially greater than that of the first, for distant observation.

The pointer shaft 35, carrying the pointer 36, fixed to the shaft is rotated directly and at a 1:1 ratio by the rack 37 through the pinion 38. The other or auxiliary pointer 39 however is indirectly actuated through the gear train comprised of gears 40, 41, 42, and 43. Gear 40 enmeshes gear 41 on stub shaft 44 which effects rotation of this shaft to rotate gear 42. The latter gear enmeshes and rotates gear 43 which, in turn rotates the sleeve 46, freely mounted on the pointer shaft 35 and which carries the auxiliary pointer 39. Thus it will be seen that through this gearing arrangement the ratio is a multiple of a 1:1 between the pointers and the movements of pointer 39, being greater, may be better observed at points distant.

The modification of the invention shown in Figure 10 is comprised of the frame 47 and rod 48, under pressure of spring 49. This arrangement operates the same as the structure described except that a wire 50 is employed to transmit motion to the pointer 51, passing over the dial 52.

The wire 50 is encased in the semi-flexible sheath 53 and is connected at one end to an arm 54, the latter in turn being joined to the rod 48. When the angular arm 55 is affixed to the cable in a manner similar to that shown in Figures 1 and 3, tension on the cable will actuate the rod and move the arm 54. Thus the wire 50 is operated to axially move the rack 56 which engages the pinion 57 on the pointer shaft. The arrangement is such that the indicator proper may be disposed at any point of advantage regardless of the location of the cable providing a mounting for the remainder of the equipment.

Referring to Figure 11, it will be observed that the usual frame 58 is provided, through which passes the rod 59. The dial 60 is either mounted on the frame or disposed at a point remote, within easy view of the operator.

Mounted on the frame is a housing 61 having a door 62 provided with a glass covered window 63. Contained in the housing is a conventional type of recording mechanism including the calibrated recording chart 64. This chart is calibrated to accord with the calibrations on the large dial 60.

When tension on the cable actuates the angular arm 65, the rod 59 is operated to effect movement of the pointer 66. Simultaneously, the stylus 67 moves on the revolving recording chart 64, impressing thereon an accurate and permanent indication of the degree of tension on the lines.

Manifestly, the construction shown is capable of considerable modification and such modification as is considered within the scope and meaning of the appended claims is also considered within the spirit and intent of the invention.

What is claimed is:

1. A cable tension indicator comprising in combination, a frame normally at right angles to said cable and having a rod movably disposed longitudinally therein and engaging said cable, link means to guide said rod in a substantially axially aligned position, spring means to normally urge said rod in a direction perpendicular to said cable, a rack carried by said rod, a pinion actuated by said rack and carrying a pointer, an elongate member affixed rigidly to said frame at a point spaced from the cable engaging point of said rod and having an angular surface over which said cable is disposed, adjustable means carried by the lower end of said member for imposing a strain on said cable at the point of contiguity with said angular surface, said member having the effect of normally urging said frame away from said cable to effect movement of said pointer.

2. An apparatus for measuring the degree of tension on a cable comprising in combination, a frame and means normally under spring tension therein engaging said cable, means to guide said first means to substantially central position relative to said frame, an elongate arm affixed to said frame and having an angular bend intermediate its ends over which said cable is secured, adjustable means to effect securement of said cable to a point on said arm below said bend whereby to urge said frame away from said cable, tension indicating means disposed on said apparatus, means connecting said indicating means and said first means whereby to indicate the degree of tension on said cable.

3. An apparatus for measuring the degree of tension on a cable comprising in combination, a frame and a rod normally under spring tension therein, a roller carried by said rod and engaging said cable, link means to guide said rod to substantially central position relative to said frame, an elongate arm affixed to said frame and having a bend in its major axis over which said cable is disposed, means on one side of said bend and engaging said cable and cooperating with said rod to impose a strain on said cable at its points of connection with said arm and having the effect of urging said frame away from said cable, a rack carried by said rod, a pinion actuated by said rack and carrying a pointer, and a calibrated dial over which said pointer moves to indicate changes in the tension on said cable.

4. An apparatus for measuring the degree of tension on a cable comprising in combination, a frame disposed operatively at right angles to said cable, an arm affixed to said frame provided with spaced apertures and having a bend intermediate its ends, clamping means by which said arm is secured to said cable whereby said cable will be constrained to follow the contour of said arm, a dial having calibrations corresponding to the spacing of the apertures in said arm, a pointer movable over said dial, a spring loaded rod also engaging said cable to apply thereto a tensional resistance against said angular arm, whereby to register on said dial the degree of tension on said test cable and means pivotally connected to said arm and to said rod to maintain centered position of the latter relative to said frame.

5. Apparatus for measuring the degree of tension on a cable comprising in combination, a frame having a rigid arm attachable to said cable provided with a series of apertures in spaced relationship and a bend intermediate its ends to secure variance in tensional strain on said cable, cable clamping means receivable in said apertures for adjustment, a spring pressed rod in said frame carrying a grooved roller to effect its connection to said cable at a point spaced from the point of securement of said angular arm to said cable, a dial having calibrations calculated according to the spacing of the apertures in said angular arm and provided with a pointer, and means controlled by said rod to effect movement of said pointer to indicate the degree of tension on said test cable.

JOSHUA C. CONRAD.